United States Patent
Wu

(10) Patent No.: US 10,609,753 B2
(45) Date of Patent: *Mar. 31, 2020

(54) BASE STATION AND COMMUNICATION DEVICE CAN SWITCH BETWEEN TWO DIFFERENT BASE STATIONS

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 179 days.

This patent is subject to a terminal disclaimer.

(21) Appl. No.: 15/880,503

(22) Filed: Jan. 25, 2018

(65) Prior Publication Data

US 2018/0213589 A1 Jul. 26, 2018

Related U.S. Application Data

(60) Provisional application No. 62/450,579, filed on Jan. 26, 2017.

(51) Int. Cl.
| | |
|---|---|
| *H04W 76/20* | (2018.01) |
| *H04W 36/14* | (2009.01) |
| *H04W 88/06* | (2009.01) |
| *H04W 76/15* | (2018.01) |

(52) U.S. Cl.
CPC ........... *H04W 76/20* (2018.02); *H04W 36/14* (2013.01); *H04W 76/15* (2018.02); *H04W 88/06* (2013.01)

(58) Field of Classification Search
CPC .............................. H04W 36/14; H04W 76/20
See application file for complete search history.

(56) References Cited

U.S. PATENT DOCUMENTS

| | | | | |
|---|---|---|---|---|
| 2015/0215965 A1* | 7/2015 | Yamada | ............ | H04W 36/0069 370/329 |
| 2015/0264562 A1 | 9/2015 | Wu | | |
| 2017/0006484 A1 | 1/2017 | Lee | | |
| 2018/0146467 A1* | 5/2018 | Kim | .................. | H04W 72/0406 |
| 2018/0213451 A1* | 7/2018 | Wu | ........................ | H04W 36/14 |

(Continued)

OTHER PUBLICATIONS

Search Report dated Mar. 26, 2018 for EP application No. 18153675.6, pp. 1-6.

(Continued)

*Primary Examiner* — Gbemileke J Onamuti
(74) *Attorney, Agent, or Firm* — Winston Hsu

(57) ABSTRACT

A first base station (BS), comprising: at least one storage device, configured to store program codes; a first communication interfacing device, configured to transmit signals or to receive signals with at least one BS; a second communication interfacing device, configured to transmit signals or to receive signals with a plurality of communication devices; at least one processing circuit, configured to execute the program codes comprising following steps: (a) associating a first PDCP SDU to a first PDCP SN or associating an IP packet included in the first PDCP SDU, wherein the first PDCP SDU comprises a flow ID and an IP packet; (b) initiating a SCG change for a first communication device with a second BS; and (c) controlling the first communication interfacing device to forward the IP packet but not to forward the flow ID, to the second BS in response to the SCG change.

13 Claims, 10 Drawing Sheets

(56) References Cited

U.S. PATENT DOCUMENTS

2019/0037457 A1* 1/2019 Jang ..................... H04L 1/1621

OTHER PUBLICATIONS

3GPP TS 36.300 V14.1.0 (Dec. 2016), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", XP051230306, pp. 1-317.
Ericsson, "Tight integration of the New Radio Interface (NR) and LTE: User Plane design", 3GPP TSG-RAN WG3 #92, R3-161293, May 23-27, 2016, Nanjing, P.R. China, XP051106093, pp. 1-4.
Huawei, HiSilicon, "A New Protocol Layer for QoS Flow to DRB Mapping", 3GPP TSG-RAN2 Meeting Ad hoc, R2-1700088, Jan. 17-19, 2017, Spokane, Washington, USA, XP051210675, pp. 1-5.
3rd Generation Partnership Project; Technical Specification Group Radio Access Network; Study on New Radio Access Technology; Radio Access Architecture and Interfaces (Release 14), 3GPP TR 38.801 V1.0.0 (Dec. 2016),pp. 1-72.
Office action dated Nov. 8, 2018 for the Taiwan application No. 107102880, filing date Jan. 26, 2018, pp. 1-5.

* cited by examiner

BASE STATION AND COMMUNICATION DEVICE CAN SWITCH BETWEEN TWO DIFFERENT BASE STATIONS

CROSS REFERENCE TO RELATED APPLICATIONS

This application claims the benefit of U.S. Provisional Application No. 62/450,579, filed on Jan. 26, 2017, the contents of which are incorporated herein by reference.

BACKGROUND OF THE INVENTION

1. Field of the Invention

The present invention relates to a base station and a communication can smoothly switch between two base stations.

2. Description of the Prior Art

3GPP recently starts developing a next generation cellular communication technology for a next generation network and a user equipment (UE). The UE in dual connectivity is connected to at least one of a (LTE) network and a new generation network.

SUMMARY OF THE INVENTION

Therefore, one objective of the present invention is to provide a seamless connectivity change for a UE while the UE is in a dual connectivity.

One example of the present invention discloses: a first base station (BS), comprising: at least one storage device, configured to store program codes; a first communication interfacing device, configured to transmit signals or to receive signals with at least one BS; a second communication interfacing device, configured to transmit signals or to receive signals with a plurality of communication devices; at least one processing circuits, coupled to the at least one storage device and the first and second communication interfacing devices, configured to execute the program codes comprising following steps: (a) associating a first PDCP SDU to a first PDCP SN or associating an IP packet included in the first PDCP SDU, wherein the first PDCP SDU comprises a flow ID and an IP packet; (b) initiating a SCG change for a first communication device with a second BS; and (c) controlling the first communication interfacing device to forward the IP packet but not to forward the flow ID, to the second BS in response to the SCG change.

One example of the present invention discloses: a communication device can communicate between a first base station (BS) and a second BS, comprising: a storage device, configured to store program codes; a communication interfacing device, configured to transmit signals or to receive signals; a processing circuit, coupled to the storage device and the communication interfacing device, configured to execute the program codes including following steps: (a) associating a first PDCP SDU to a first PDCP SN, wherein the first PDCP SDU comprises a flow ID and an IP packet; (b) controlling the communication interfacing device to receive a first RRC message from the first BS, wherein the first RRC message changes a DRB from a MGC bearer or a MGC split bearer to a SCG bearer or a SCG split bearer; and (c) controlling the communication interfacing device to transmit a first PDCP PDU to the second BS when the DRB is changed to the SCG bearer or the SCG split bearer, wherein the first PDCP PDU comprises the IP packet but does not include the flow ID.

Another example of the present invention discloses: a first base station (BS), comprising: at least one storage device, configured to store program codes; a first communication interfacing device, configured to transmit signals or to receive signals with at least one BS; a second communication interfacing device, configured to transmit signals or to receive signals with a plurality of communication devices; at least one processing circuit, coupled to the at least one storage device and the communication interfacing device, configured to execute the program codes comprising following steps: (a) controlling the first communication interfacing device to receive a first SBS addition request message or a first SBS modification request message for a first communication device, from the second BS; (b) configuring a flow ID and a DRB to the first communication device via the second BS, in response to the first SBS addition request message or the first SBS modification request message, wherein the DRB is a SCG bearer or a SCG split bearer and the flow ID identifies a data flow; (c) associating a first PDCP SDU to a first PDCP SN or associates an IP packet in the first PDCP SDU to the first PDCP SN for the first communication device, wherein the first PDCP SDU comprises the flow ID and an IP packet; (d) performing a SBS release or a release of the SCG bearer or the SCG split bearer for the first communication device; and (e) controlling the first communication interfacing device to forward the IP packet but not to forward the flow ID, to the second BS, in response to the SBS release or the release of the SCG bearer or the SCG split bearer.

In view of above-mentioned examples, a better connectivity change for the UE in a dual connectivity can be acquired.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
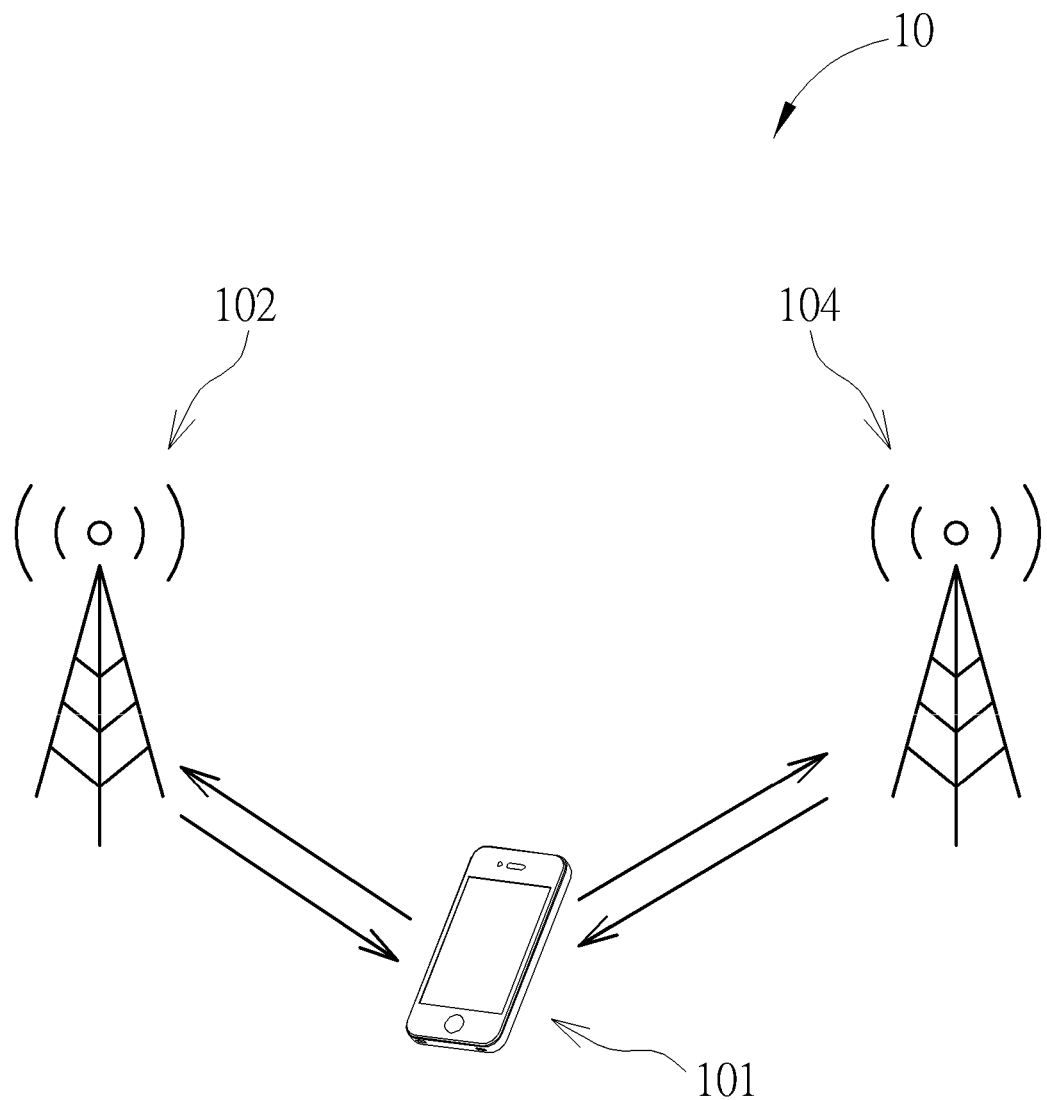
FIG. 1 is a schematic diagram of a wireless communication device according to an example of the present invention.

FIG. 1 is a schematic diagram of a wireless communication system 10 according to an example of the present invention. The wireless communication system 10 is composed of a communication device 101, base stations (BSs) 102 and 104. In FIG. 1, the communication device 101, the BSs 102 and 104 and are utilized for illustrating the structure of the wireless communication system 10. Practically, each of the BSs 102 and 104 may be an evolved Node-B (eNB) or a fifth generation (5G) (or called new radio (NR)) BS (i.e.

gNB). The eNB may connect to an Evolved Packet Core or a Next Generation (NG) Core (NGC) and the 5G BS may connect to the NGC. The communication device 101 may be configured to communicate with the BSs 102 and 104 simultaneously according to dual connectivity (DC). That is, the communication device 101 may perform transmissions/receptions via both the BSs 102 and 104. In addition, one of the BSs 102 and 104 may be a master BS (MBS) and the other BS may be a secondary BS (SBS). The MBS may be an eNB and the SBS is a gNB. Alternatively, the MBS is a gNB and the SBS is an eNB.

The communication device may be a user equipment (UE), a mobile device, a smartphone, a laptop, a vehicle or an aircraft.

Figure 2:
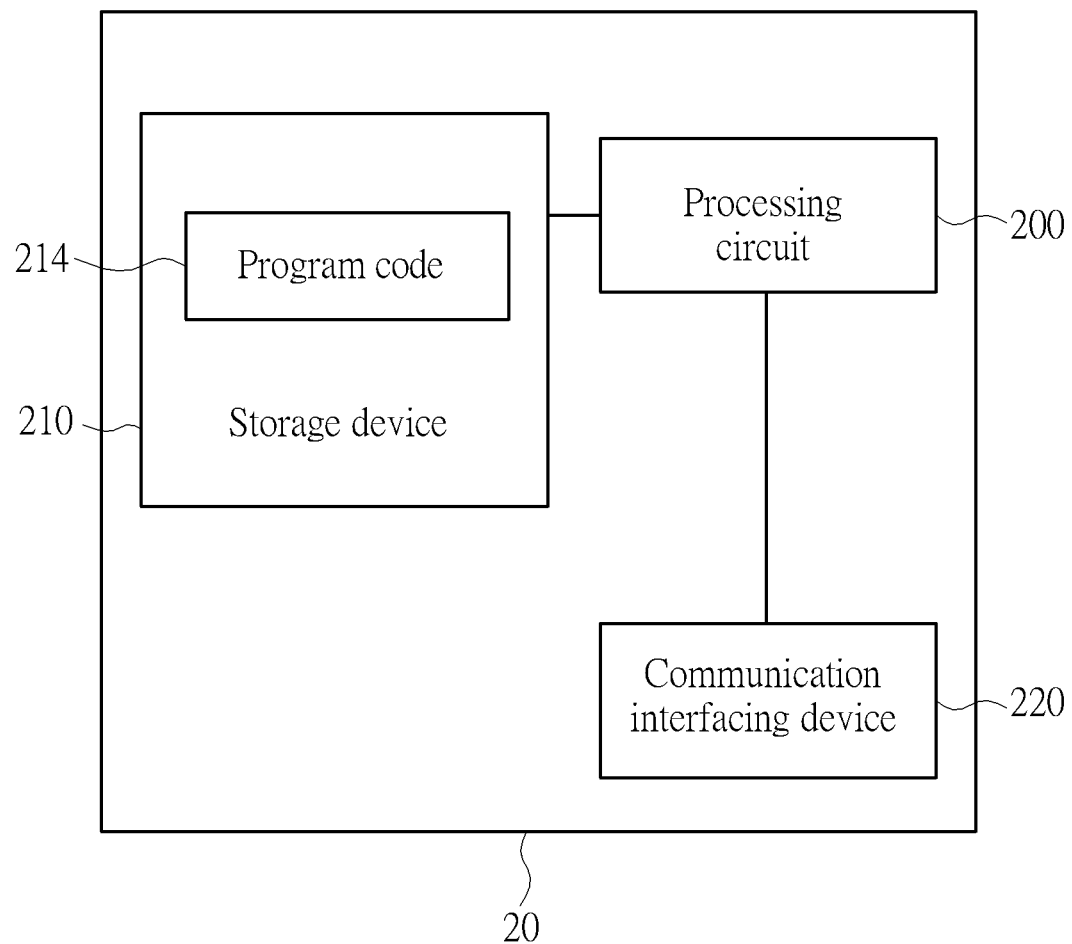
FIG. 2 is a schematic diagram of a communication device according to an example of the present invention.

FIG. 2 is a schematic diagram of a communication device 20 according to an example of the present invention. The communication device 20 may be a communication device or the BS shown in FIG. 1, but is not limited herein. The communication device 20 may include at least one processing circuit 200 such as at least one microprocessor or Application Specific Integrated Circuit, at least one storage device 210 and at least one communication interfacing device 220. The at least one storage device 210 may be any data storage device that may store at least one program code 214, accessed and executed by the at least one processing circuit 200. Examples of the at least one storage device 210 include but are not limited to a subscriber identity module, read-only memory, flash memory, random-access memory, hard disk, optical data storage device, non-volatile storage device, non-transitory computer-readable medium (e.g., tangible media), etc. Each of the at least one communication interfacing device 220 includes at least one transceiver and is used to transmit and receive signals (e.g., data, messages and/or packets) according to processing results of the at least one processing circuit 200. For example, when the communication device 20 is a BS, the at least one communication interfacing device 220 includes a first communication interfacing device and a second communication interfacing device. The first communication interfacing device is used to transmit and/or receive signals with at least one BS according to processing results of a first processing circuit. The second communication interfacing device is used to transmit and/or receive signals with the communication devices in FIG. 1 according to processing results of the first processing circuit or a second processing circuit.

A radio bearer (RB) can be a data RB (DRB) for user plane data transmission and/or reception for a signaling RB (SRB) for control plane data transmission and/or reception. A DRB configuration includes a DRB identity, Packet Data Convergence Protocol (PDCP) configuration (e.g. header compression configuration or reordering timer), logical channel (LC) identity and LC configuration (e.g. priority and LC group). A SRB configuration includes SRB identity, Radio Link Control (RLC) configuration and LC configuration.

Figure 3:
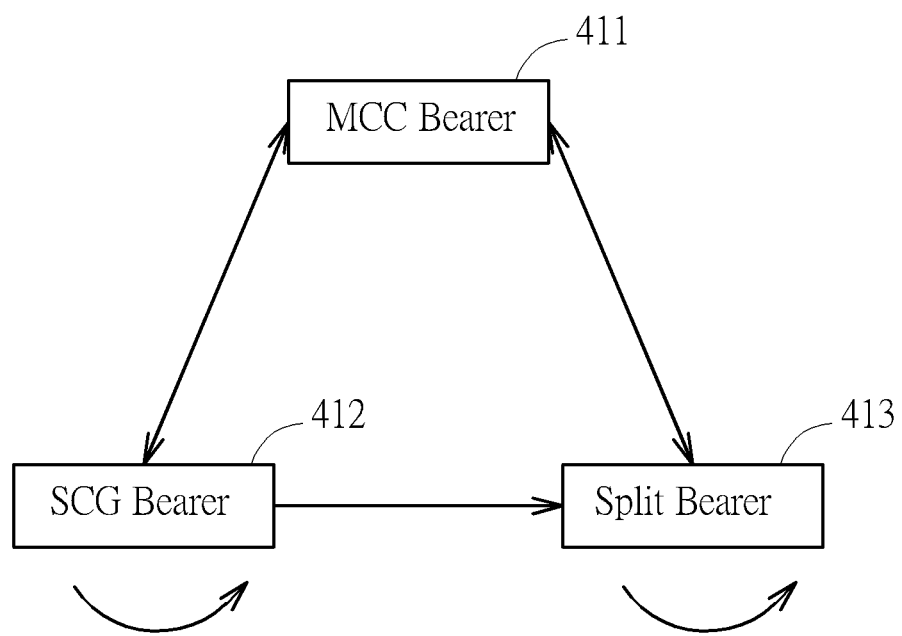
FIG. 3 is schematic diagrams illustrating dual connectivity.

In DC, as shown in FIG. 3, there are three types of dual connectivity radio bearers: Master cell group (MCG) bearer 411, secondary cell group (SCG) bearer 412 and split bearer 413. The MCG bearer 411 utilizes radio protocols only located in MBS to use MBS resources only (e.g. the resources of the first BS BS_1 in FIG. 3). SCG bearer 212 utilizes radio protocols only located in the SBS (e.g. the second BS BS_2 in FIG. 3) to use SBS resources. Split bearer 213 utilizes radio protocols located in both the MBS and the SBS to use both MBS and SBS resources. The split bearer can be via MCG (i.e. MCG split bearer) or via SCG (i.e. SCG split bearer). In general, a RB can be a MCG bearer, a SCG bearer, or a split bearer.

Figure 4:
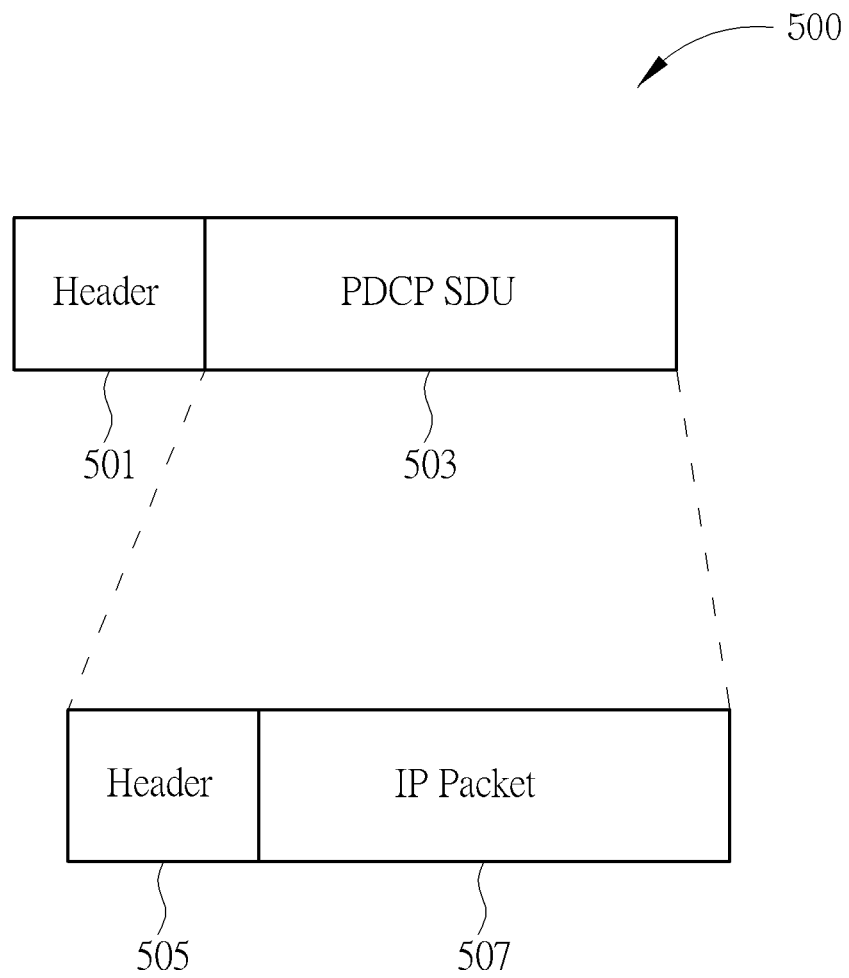
FIG. 4 is a schematic diagram illustrating a PDCP PDU and a PDCP SDU for a next generation network.
Figure 5:
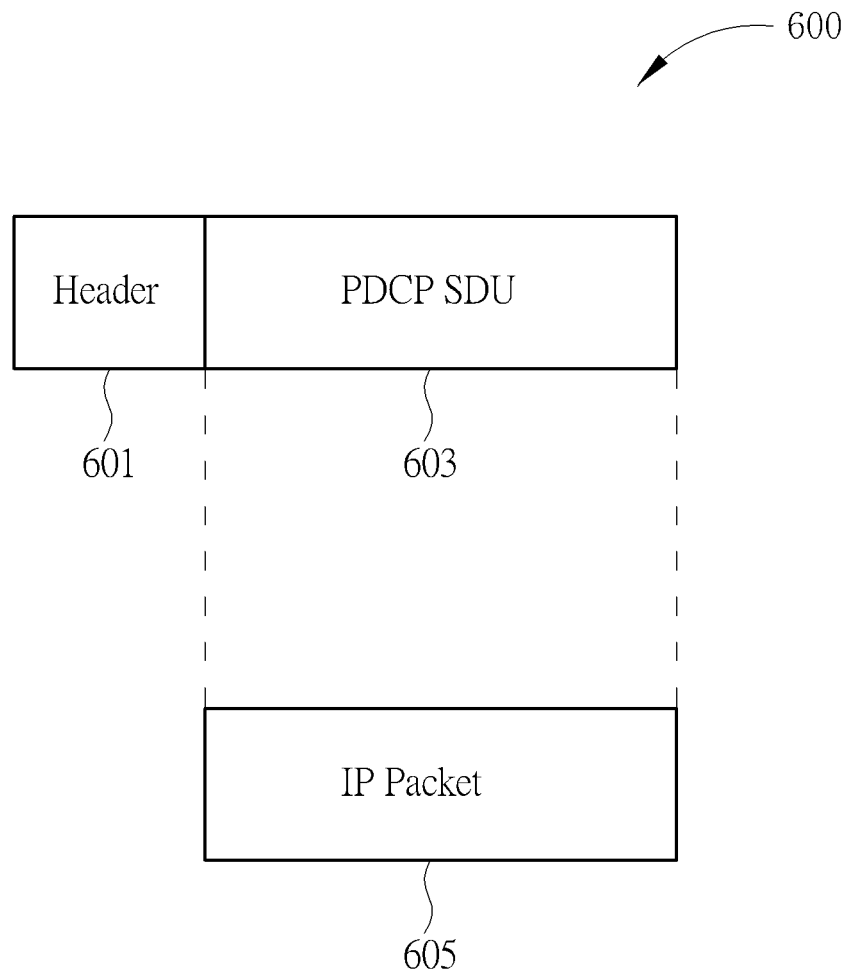
FIG. 5 is a schematic diagram illustrating a PDCP PDU for a LTE network.

FIG. 4 is a schematic diagram illustrating a PDCP PDU and a PDCP SDU for a next generation (NG) network including a 5G BS. As illustrated in FIG. 5, the PDCP PDU 500 comprises a header 501 and a PDCP SDU 503. The header 501 may comprise, for example, a PDCP SN (sequence number). Also, the PDCP SDU 503 may comprise a header 505 and an Internet Protocol (IP) packet 507. The header 505 may comprise, for example, a flow identity/identifier (ID).

Figure 6:
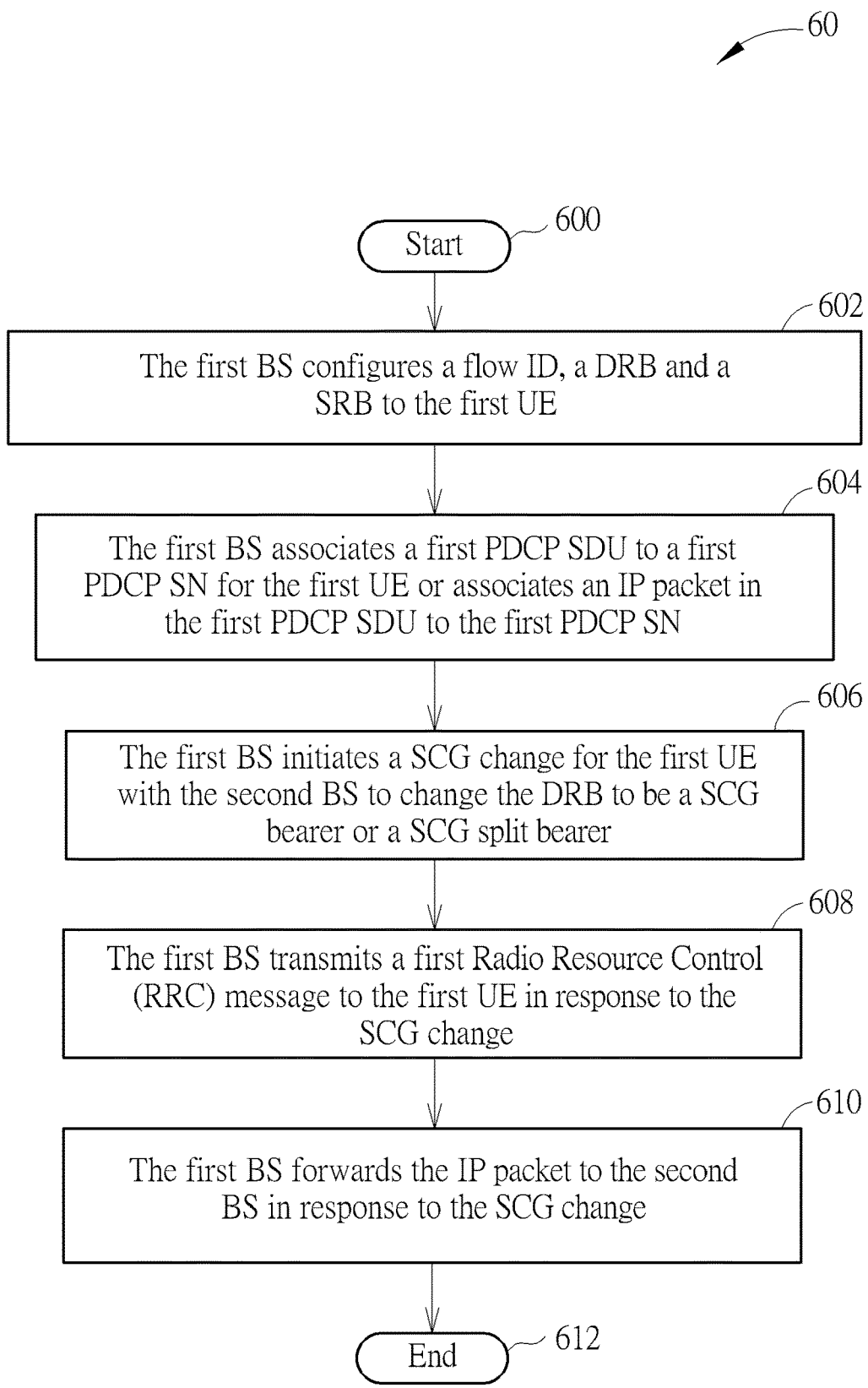
FIG. 6-FIG. 10 are flow chart illustrating the operations for the communication devices or the target electronic device.

FIG. 5 is a schematic diagram illustrating a PDCP PDU for an eNB. As illustrated in FIG. 6, similar with the PDCP PDU 500, the PDCP PDU 600 comprises a header 601 and a PDCP SDU 603. However, the PDCP SDU 603 comprises the IP packet 605 but does not comprise the header 505. Accordingly, if the PDCP SDU 503 is transmitted from the NG network to the LTE network, the eNB recognizes the PDCP SDU 503 as the PDCP SDU 603. Thus, the eNB may not correctly decode the IP packet 507.

In following descriptions, examples are provided to explain the concept of the present application. Please refer figures for following examples in conjunction with the above-mentioned FIGS. 1-5 to understand for more clarity. A UE is used to represent the communication device 101 in FIG. 1 to simplify the illustration of the embodiments. A first BS is used to represent one of BSs 102 and 104 in FIG. 1 and a second BS is used to represent the other of BSs 102 and 104 in FIG. 1.

A process 60 is utilized in the first BS to forward data to the second BS for a first UE and includes the following steps, as illustrated in FIG. 6:

Step 600: Start.

Step 602: The first BS configures a flow ID, a DRB and a SRB to the first UE, wherein the DRB is a MCG bearer or a MCG split bearer and the flow ID identifies a data flow.

Step 604: The first BS associates a first PDCP SDU to a first PDCP SN for the first UE or associates an IP packet in the first PDCP SDU to the first PDCP SN, wherein the first PDCP SDU includes a flow ID and the IP packet and is to be transmitted on the DRB.

Step 606: The first BS initiates a SCG change for the first UE with the second BS to change the DRB to be a SCG bearer or a SCG split bearer.

Step 608: The first BS transmits a first Radio Resource Control (RRC) message to the first UE in response to the SCG change.

Step 610: The first BS forwards the IP packet to the second BS in response to the SCG change. In one example, the first BS forwards the IP packet but does not forward the flow ID to the second BS.

Step 612: End.

When the second BS receives the IP packet, the second BS may compress the IP packet to a first compressed packet. The second BS may encrypt the IP packet or the first compressed packet (if the compressed is applied/configured) to a first encrypted packet. The second BS transmits a second PDCP PDU over the SCG bearer or the SCG split bearer to the first UE. Data field in the second PDCP PDU includes the IP packet if no compression and encryption are applied, the data field includes the first compressed packet if compression is applied but no encryption is applied, or the data field includes the first encrypted packet if the encryption is applied. The first UE follows the first RRC message to perform the SCG change (i.e. changing the DRB to be the SCG bearer or the SCG split bearer). The first UE transmits a first RRC response message responding the first RRC message, to the first BS.

According to the above-mentioned descriptions, the first BS does not forward the complete first PDCP SDU to the second BS. Instead, the first BS forwards the IP packet to the second BS. That is, the first BS does not forward the flow ID with the IP packet in a format of a PDCP SDU to the second BS. If the first BS forwards the first PDCP SDU to the second BS. The second BS incorrectly decodes the first PDCP SDU.

In one example, the first BS may initiate a SCG change for a second UE with a third BS to change a DRB of the second UE from the MCG bearer or MCG split bearer to be the SCG bearer or the SCG split bearer. The first BS transmits a third RRC message to second UE in response to the SCG change. The first BS forwards a first PDCP SDU for the second UE to the third BS in response to the SCG change. The first PDCP SDU includes an IP packet and a flow ID. The second UE transmits a third RRC response message to the first BS. The third BS may compress the IP packet in the first PDCP SDU to a second compressed packet if the compression is configured by the third BS to the second UE in the SCG change (e.g. in the third RRC message). The third BS generates a second PDCP SDU which contains the second compressed packet and the flow ID. The third BS may encrypt the second PDCP SDU to a first encrypted PDCP SDU. When the third BS connects to the second UE, the third BS transmits a third PDCP PDU to the second UE, wherein data field in the third PDCP PDU includes the first encrypted PDCP SDU.

If the compression is not configured, the third BS may or may not construct a second PDCP SDU which contains the IP packet and the flow ID. If the third BS does not construct the second PDCP SDU, the third BS just reuses the first PDCP SDU received from the first BS. The third BS may encrypt the first/second PDCP SDU to a second encrypted PDCP SDU. When the third BS connects to the second UE, the third BS transmits a third PDCP PDU to the second UE, wherein data field in the third PDCP PDU includes the second encrypted PDCP SDU.

Alternatively, the first BS forwards the IP packet and the flow ID separately (i.e. which are not in the format of the first PDCP SDU) to the third BS in the example above.

The first BS may or may not transmit the first PDCP SDU in a fourth PDCP PDU to the first UE before the SCG change. If the first BS transmits the fourth PDCP PDU to the first UE, the first BS forwards the IP packet to the second BS or the first PDCP SDU to the third BS because the first BS does not receive a message acknowledging the first PDCP SDU or the fourth PDCP PDU from the first UE. The message may be a PDCP status report or a Radio Link Control (RLC) acknowledgement.

The first BS may or may not forward the first PDCP SN to the second BS. If the first PDCP SN is forwarded, a SN field in a header of the second PDCP PDU includes the first PDCP SN. Otherwise, the SN field includes a second PDCP SN set by the second BS according to transmission order/sequence of the PDCP SDU. The second PDCP SN is irrespective of the first PDCP SN.

The first BS may or may not forward the first PDCP SN to the third BS. If the first PDCP SN is forwarded, a SN field in a header of the third PDCP PDU includes the first PDCP SN. Otherwise, the SN field includes a third PDCP SN set by the third BS according to transmission order/sequence of the second (encrypted) PDCP SDU. The third PDCP SN is irrespective of the first PDCP SN.

In one example, the first BS may forward the first PDCP SN to the second BS and/or the third BS, if the first BS configures a RLC acknowledged mode (AM) for the DRB. In one example, the first BS may not forward the first PDCP SN to the second BS and/or third BS, if the first BS configures a RLC unacknowledged mode (UM) for the DRB. In one example, the first BS may not forward the first PDCP SN to the second BS and/or third BS in irrespective of the RLC AM or UM configured for the DRB.

Figure 7:
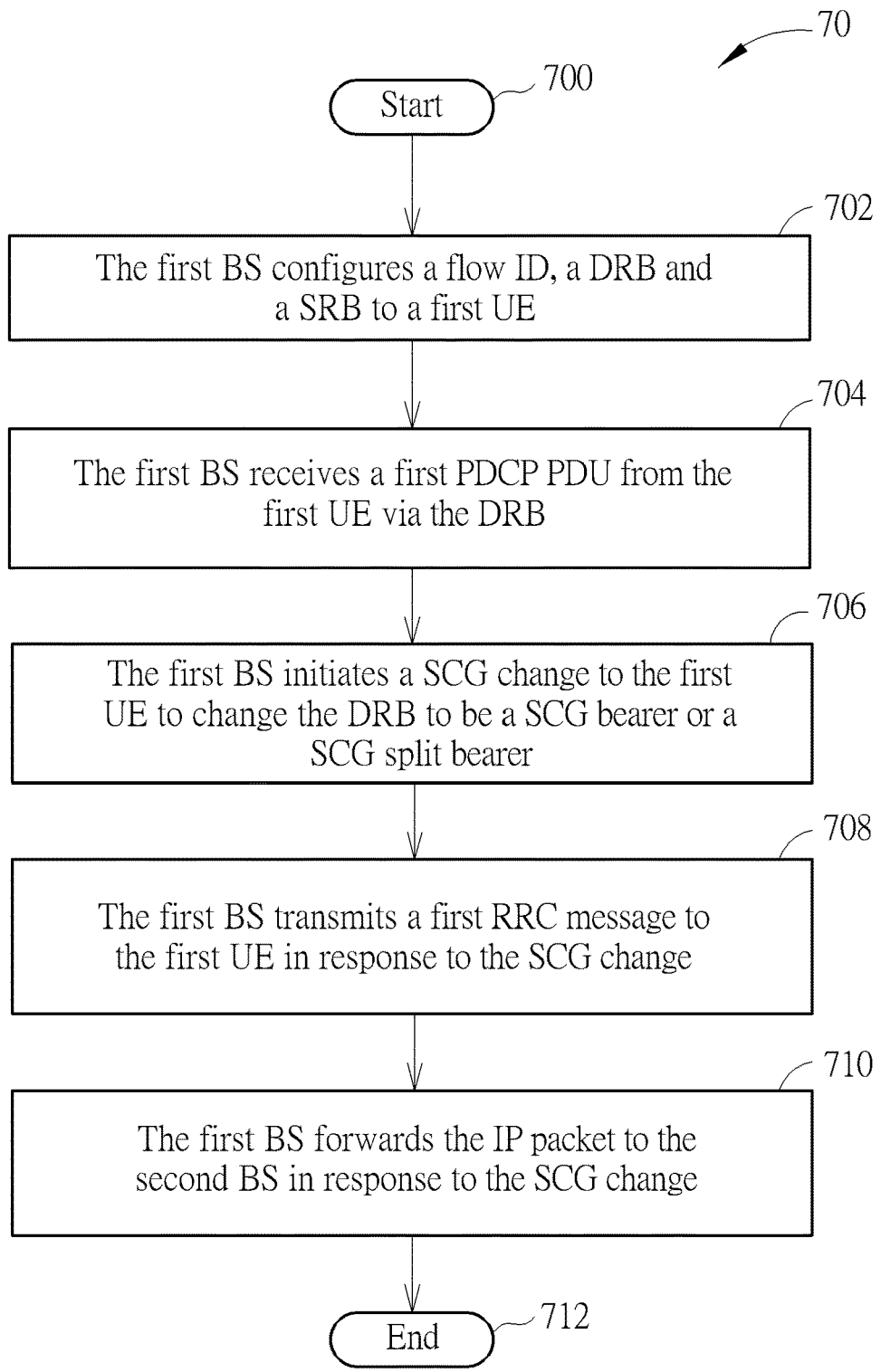

A process 70 below is similar with the process 60. However, the first BS receives the first PDCP PDU rather than generates the first PDCP PDU. The process 70 is utilized in the first BS and includes the following steps shown in FIG. 7:

Step 700: Start.

Step 702: The first BS configures a flow ID, a DRB and a SRB to a first UE, wherein the DRB is a MCG bearer or a MCG split bearer and the flow ID identifies a data flow.

Step 704: The first BS receives a first PDCP PDU from the first UE via the DRB, wherein the first PDCP PDU includes a first PDCP SDU and a first PDCP SN and the first PDCP SDU includes the flow ID and an IP packet.

Step 706: The first BS initiates a SCG change to the first UE to change the DRB to be a SCG bearer or a SCG split bearer.

Step 708: The first BS transmits a first RRC message to the first UE in response to the SCG change.

Step 710: The first BS forwards the IP packet to the second BS in response to the SCG change. In one example, the first BS forwards the IP packet but does not forward the flow ID to the second BS.

Step 712: End.

The first UE follows the first RRC message to perform the SCG change (i.e. changing the DRB to be a SCG bearer or a SCG split bearer). The first UE transmits a first RRC response message responding the first RRC message, to the first BS.

If the first PDCP SDU is encrypted by the UE, the first BS decrypts the first PDCP SDU. If the IP packet is compressed by the UE, the first BS decompress the IP packet. Description about the compression and encryption for the first BS in the process 60 is applied to the UE in the process 70 and not repeated herein.

The first BS does not forward the complete first PDCP SDU to the second BS. Instead, the first BS forwards the IP packet to the second BS. That is, the first BS does not forward the flow ID with the IP packet to the second BS. If the first BS forwards the complete first PDCP SDU to the second BS, the second BS transmits the first PDCP SDU to a core network (CN). The CN may incorrectly decode the first PDCP SDU due to the flow ID included in the first PDCP SDU since the CN may expect the first PDCP SDU is an IP packet.

In one example, the first BS initiates a SCG change for a second UE with a third BS to change a DRB of the second UE from a MCG bearer or a MCG split bearer to a SCG bearer or a SCG split bearer. The first BS transmits a second RRC message to the second UE for the SCG change. The first BS forwards a first PDCP SDU received from the second UE to the third BS in response to the SCG change. The third BS extracts the flow ID and the IP packet from the first PDCP SDU and sends the IP packet to a CN according to the flow ID. In another example, the first BS forwards the IP packet and the flow ID to the third BS. The third BS sends the IP packet to the CN according to the flow ID. That is, the third BS does not need to extract the flow ID and the IP packet from the first PDCP SDU.

In one example, the first BS forwards the IP packet but does not forward the flow ID to the third BS in response to the SCG change with the third BS. The third BS sends the IP packet to a CN according to a predetermined flow ID (e.g. a default flow ID).

The first BS may or may not forward the first PDCP SN to the second BS. If the first PDCP SN is forwarded, the second BS uses the first PDCP SN for reordering the IP packet. That is, the second BS delivers the IP packet to an upper layer than a PDCP layer in the second BS or sends the IP packet to the CN, when the second BS receives second PDCP SDU(s) associated to second SN(s) before the first PDCP SN. Otherwise, the second BS does not reorder the IP packet and just delivers the IP packet to the upper layer or sends the IP packet to the CN.

The first BS may or may not forward the first PDCP SN to the third BS. If the first PDCP SN is forwarded, the third BS uses the first PDCP SN for reordering the first PDCP SDU or the IP packet. That is, the third BS delivers the first PDCP SDU to an upper layer than a PDCP layer in the third BS to process the first PDCP SDU or sends the IP packet to the CN when the third BS receives second PDCP SDU(s) associated to second SN(s) before the first PDCP SN. Otherwise, the third BS does not reorder the first PDCP SDU and just delivers the first PDCP SDU to the upper layer or sends the IP packet to the CN. A function of the upper layer is to add/remove flow ID to/from the PDCP SDU.

In one example, the first BS may forward the first PDCP SN to the third BS and does not forward the first PDCP SN to second BS. In another example, the first BS may forward the first PDCP SN to the second BS and/or the third BS.

In one example, the first BS may forward the first PDCP SN if the first BS configures RLC AM for the DRB. In one example, the first BS may not forward the first PDCP SN if the first BS configures RLC UM for the DRB. In one example, the first BS BS_1 may not forward the first PDCP SN in irrespective of the RLC AM or UM configured for the DRB.

Figure 8:
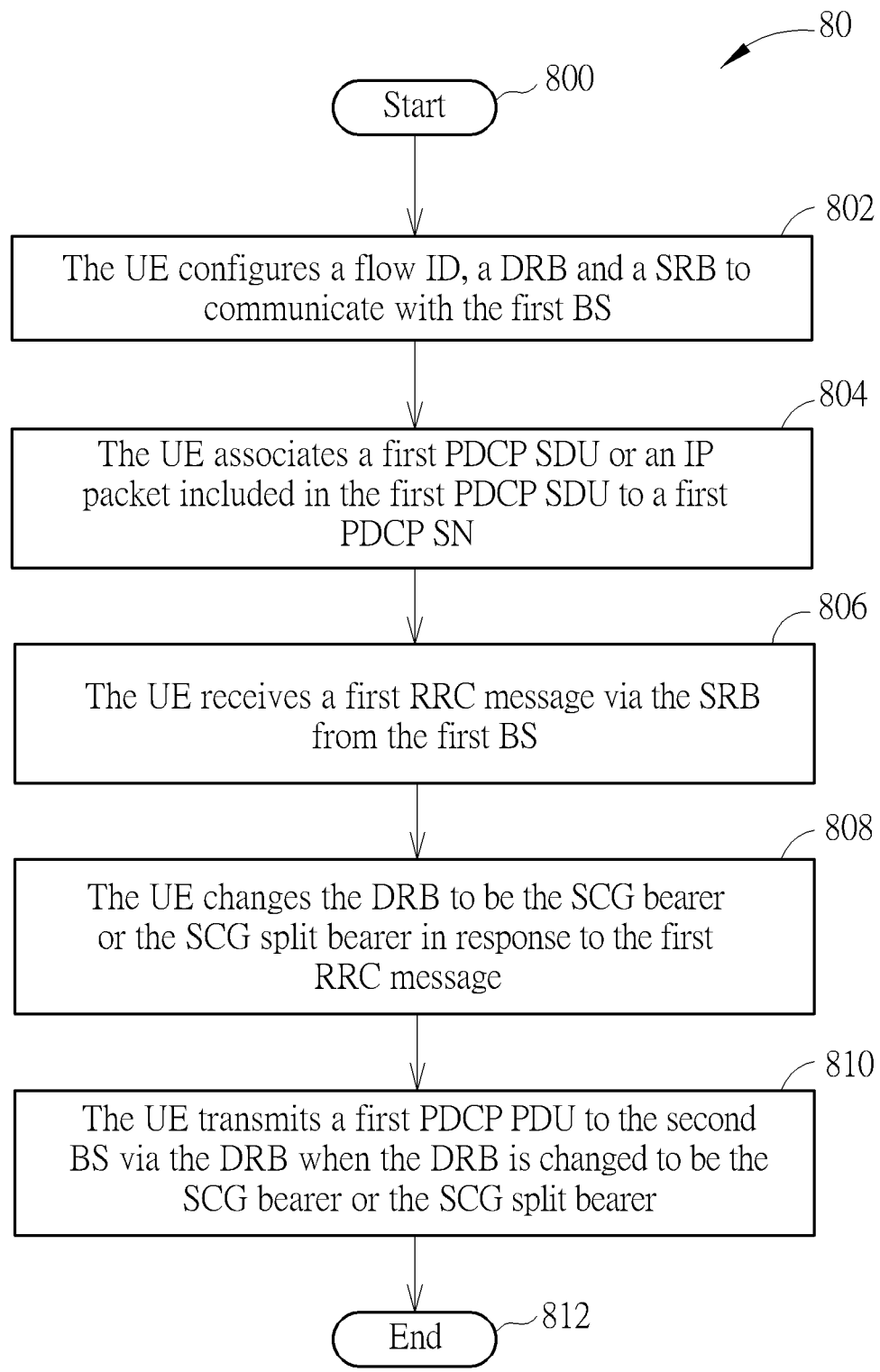

A process 80 illustrates operations for the UE during a SCG change, according to an example of the present invention and includes the following steps illustrated in FIG. 8:

Step 800: Start.

Step 802: The UE configures a flow ID, a DRB and a SRB to communicate with the first BS, wherein the DRB is a MCG bearer or a MCG split bearer and the flow ID identifies a data flow.

Step 804: The UE associates a first PDCP SDU or an IP packet included in the first PDCP SDU to a first PDCP SN, wherein the first PDCP SDU includes the flow ID and the IP packet and is to be transmitted on the DRB.

Step 806: The UE receives a first RRC message via the SRB from the first BS, wherein the first RRC message changes the DRB to be a SCG bearer or a SCG split bearer for communicating with the a second BS.

Step 808: The UE changes the DRB to be the SCG bearer or the SCG split bearer in response to the first RRC message.

Step 810: The UE transmits a first PDCP PDU to the second BS via the DRB when the DRB is changed to be the SCG bearer or the SCG split bearer, wherein the first PDCP PDU includes the IP packet and does not include the flow ID.

Step 812: End.

Here are examples of transmitting the IP packet to the second BS.

In one example, the UE compresses the IP packet to a first compressed packet if the first RRC message configures compression. In another example, the UE does not compress the IP packet if the first RRC message does not configure the compression. Then the UE encrypts the IP packet or the first compressed packet to a first encrypted packet, e.g. according to an encryption algorithm configured in the first RRC message. When the UE connects to the second BS, the UE transmits the first PDCP PDU to the second BS. Data field in the first PDCP PDU includes the IP packet if no compression and encryption are applied, the data field includes the first compressed packet if no encryption is applied, or the data field includes the first encrypted packet if the encryption is applied. Namely, the second BS decrypts the first encrypted packet to the IP packet or the first compressed packet when the second BS receives the first PDCP PDU. The second BS decompresses the first compressed packet.

The UE follows the first RRC message to perform the SCG change. The UE transmits a first RRC response message responding the first RRC message, to the first BS.

In one example, the UE receives a third RRC message from the first BS for a SCG change (i.e. changing DRB from the MCG bearer or the MCG split bearer to a SCG bearer or a SCG split bearer) for communicating with a third BS. In one example, the UE compress the IP packet to a second compressed packet if the UE is configured to perform the compression in the third RRC message. The UE constructs a second PDCP SDU which includes the second compressed packet or the IP packet, and includes the flow ID. That is, the UE does not compress the flow ID in the second PDCP SDU. The UE may encrypt the second PDCP SDU to a second encrypted PDCP SDU. The UE transmits a second PDCP PDU to the third BS via the DRB, wherein data field in the second PDCP PDU either includes the encrypted second PDCP SDU or the second PDCP SDU depending on the encryption is configured or not.

The UE may or may not transmit the first PDCP SDU in a third PDCP PDU to the first BS before the SCG change. The third PDCP PDU includes the first PDCP SN. If the UE transmits the third PDCP PDU to the first BS, the UE transmits the first/second PDCP PDU to the second/third BS because the UE does not receive a message acknowledging the first PDCP SDU or the third PDCP PDU from the first BS. The message may be a RLC acknowledgement or a PDCP status report.

The UE may or may not use the first PDCP SN. If the first PDCP SN is used, a SN field in a header of the first PDCP PDU includes the first PDCP SN. Otherwise, the SN field includes a second SN set by the UE according to transmission order/sequence of the first PDCP SDU. The second SN is irrespective of the first PDCP SN.

The UE may or may not use the first PDCP SN. If the first PDCP SN is used, a SN field in a header of the second PDCP PDU includes the first PDCP SN. Otherwise, the SN field includes a second SN set by the UE according to transmission order/sequence of the PDCP SDU. The second SN is irrespective of the PDCP first SN.

In one example, the UE may use the first PDCP SN in the second PDCP PDU and does not use the first PDCP SN in the first PDCP PDU.

In one example, the UE uses the first PDCP SN if the first BS configures RLC AM for the DRB. In one example, the UE may not use the first PDCP SN if the first BS configures RLC UM for the DRB. In one example, the UE may not use the first PDCP SN in irrespective of the RLC AM or UM configured for the DRB.

Figure 9:
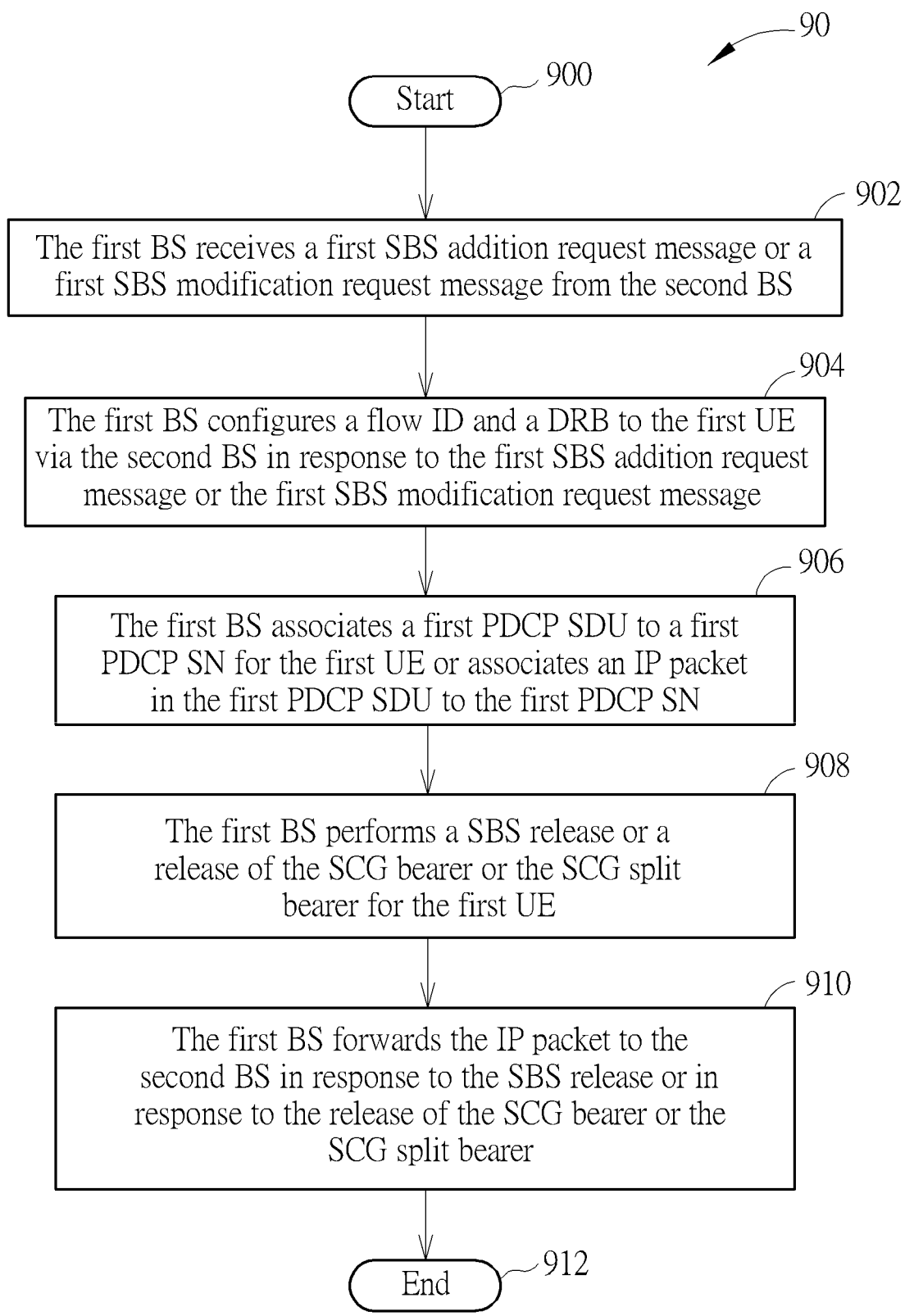

A process 90 includes the following steps, as illustrated in FIG. 9:

Step 900: Start.

Step 902: The first BS receives a first SBS addition request message or a first SBS modification request message for a first UE from the second BS.

Step 904: The first BS configures a flow ID and a DRB to the first UE via the second BS, in response to the first SBS addition request message or the first SBS modification request message, wherein the DRB is a SCG bearer or a SCG split bearer and the flow ID identifies a data flow.

Step 906: The first BS associates a first PDCP SDU to a first PDCP SN for the first UE or associates an IP packet in the first PDCP SDU to the first PDCP SN for the first UE, wherein the first PDCP SDU includes a flow ID and the IP packet and is to be transmitted on the DRB.

Step 908: The first BS performs a SBS release or a release of the SCG bearer or the SCG split bearer for the first UE.

Step 910: The first BS forwards the IP packet to the second BS in response to the SBS release or in response to the release of the SCG bearer or the SCG split bearer. In one example, the first BS forwards the IP packet but does not forward the flow ID to the second BS.

Step 912: End.

According to the process 90, the first BS forwards the IP packet instead of the complete first PDCP SDU to the second BS. The second BS processes the IP packet as described above (such as compression/encryption description in the process 60 not repeated herein) and transmits the processed (compressed/encrypted) IP packet to the first UE.

In one example, the first BS receives a second SBS addition request message or a second SBS modification request message for a second UE from a third BS. The first BS configures a flow ID and a DRB to the second UE via the third BS, in response to the second SBS addition request message or second SBS modification request message, wherein the DRB is a SCG bearer or a SCG split bearer and the flow ID identifies a data flow. The first BS associates a first PDCP SDU to a first PDCP SN for the second UE or associates an IP packet in the first PDCP SDU, wherein the first PDCP SDU includes a flow ID and the IP packet and is to be transmitted on the DRB. The first BS performs a SBS release or a release of the SCG bearer or the SCG split bearer for the second UE. The first BS forwards the IP packet and the flow ID to the third BS in response to the SBS release or in response to the release of the SCG bearer or the SCG split bearer. The third BS processes the IP packet as described above (such as compression/encryption description in the process 60 not repeated herein) and transmits the processed (compressed/encrypted) IP packet to the second UE.

The DRB may be configured to be a MCG bearer or a MCG split bearer in response to the release of the SCG bearer or the SCG split bearer. The third BS may process and/or transmit the IP packet and/or the first PDCP SDU to the second UE as described for the process 60.

The SBS release or the release of the SCG bearer or the SCG split bearer may be initiated by the first BS or the second/third BS.

Figure 10:
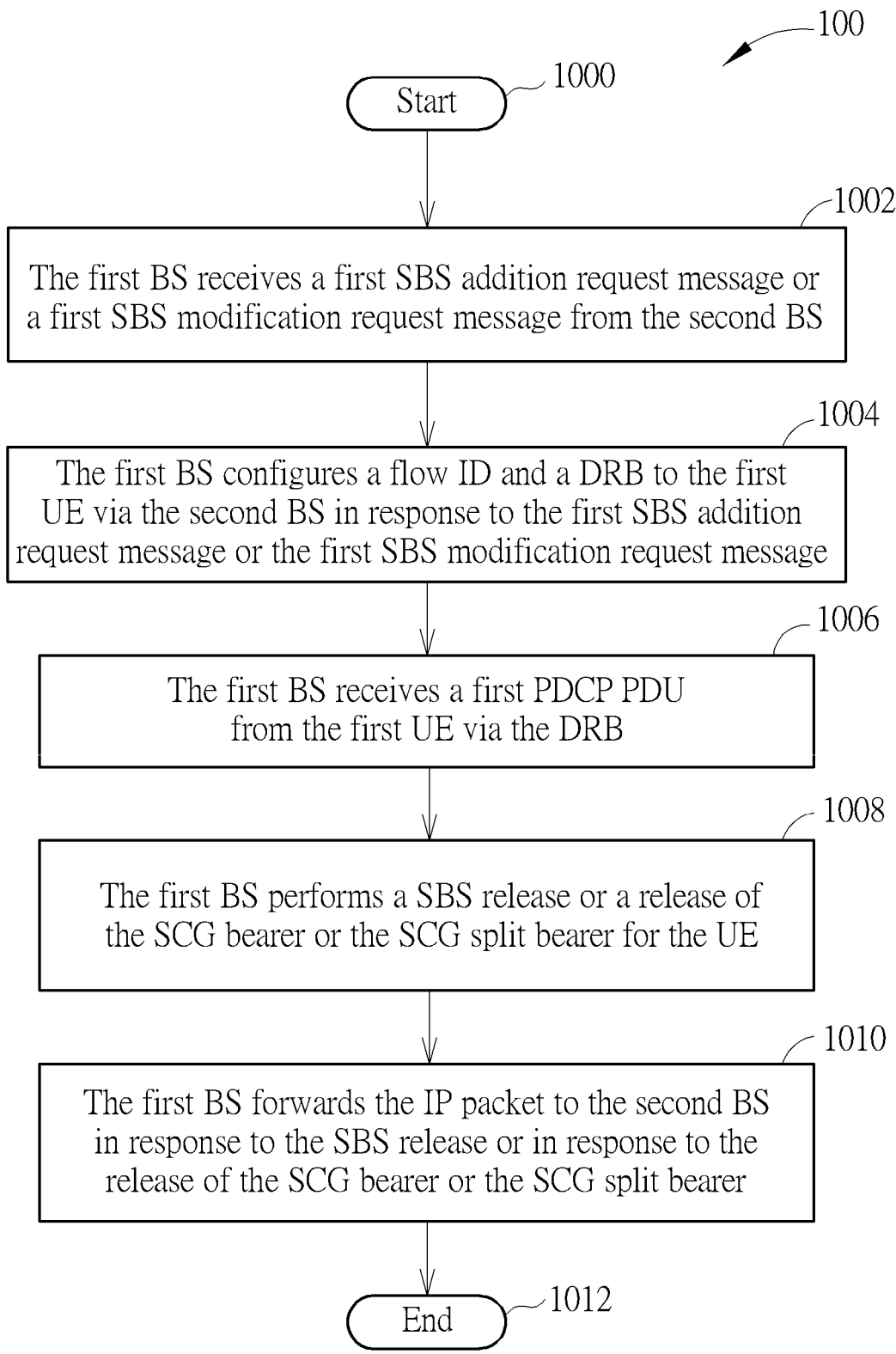

A process 100 includes the following steps, as illustrated in FIG. 10:

Step 1000: Start.

Step 1002: The first BS receives a first SBS addition request message or a first SBS modification request message for a first UE from the second BS.

Step 1004: The first BS configures a flow ID and a DRB to the first UE via the second BS in response to the first SBS addition request message or the first SBS modification request message, wherein the DRB is a SCG bearer or a SCG split bearer and the flow ID identifies a data flow.

Step 1006: The first BS receives a first PDCP PDU from the first UE via the DRB, wherein the first PDCP PDU includes a first PDCP SDU and a first PDCP SN and the first PDCP SDU includes the flow ID and an IP packet.

Step 1008: The first BS performs a SBS release or a release of the SCG bearer or the SCG split bearer for the first UE.

Step 1010: The first BS forwards the IP packet to the second BS in response to the SBS release or in response to the release of the SCG bearer or the SCG split bearer. In one example, the first BS forwards the IP packet but does not forward the flow ID to the first UE.

Step 1012: End.

According to the process 110, the first BS forwards the IP packet instead of the complete first PDCP SDU to the first UE. The second BS sends the IP packet to a CN.

In one example, the first BS receives a second SBS addition request message or a second SBS modification request message for a second UE from a third BS. The first BS configures a flow ID and a DRB to the second UE via the third BS, in response to the second SBS addition request message or second SBS modification request message, wherein the DRB is a SCG bearer or a SCG split bearer and the flow ID identifies a data flow. The first BS receives a first PDCP PDU from the second UE via the DRB, wherein the first PDCP PDU includes a first PDCP SDU and a first PDCP SN and the first PDCP SDU includes the flow ID and an IP packet. The first BS performs a SBS release or a release of the SCG bearer or the SCG split bearer for the second UE. The first BS forwards the IP packet and the flow ID to the third BS in response to the SBS release or in response to the release of the SCG bearer or the SCG split bearer. The third BS sends the IP packet according to the flow ID to a CN. The first or third BS may initiate the SBS release or the release of the SCG bearer or the SCG split bearer.

In one example, the UE generates the first PDCP PDU and directly transmits the first PDCP PDU during the SCG change.

Examples below may be applied to the processes 90-100.

The UE configures a flow ID and a DRB (e.g. according to configuration(s) (e.g. DRB configuration) received from the first BS via the second/third BS), to communicate with the first BS, wherein the DRB is a SCG bearer or a SCG split bearer and the flow ID identifies a data flow. The UE associates a first PDCP SDU to a first PDCP SN, wherein the first PDCP SDU includes the flow ID and an IP packet and is to be transmitted on the DRB. The UE receives a first RRC message via a SRB from the second/third BS, wherein the first RRC message changes the DRB to be a MCG bearer or a MCG split bearer for communicating with the second BS. The UE changes the DRB to be the MCG bearer or the MCG split bearer in response to the first RRC message. The UE transmits a first PDCP PDU to the second BS via the DRB when the DRB is changed to be the MCG bearer or the MCG split bearer, wherein the first PDCP PDU includes the IP packet and does not include the flow ID. The UE processes the IP packet as described above (such as compression/encryption description in the process 80 not repeated herein) and transmits the processed (compressed/encrypted) IP packet to the second/third BS.

Realization of the processes above is not limited to the above description. Any of the processes above may be combined. Examples below may be applied to any of the processes above.

The first and second UEs may be same or different UEs.

The PDCP SDU including the IP packet and the flow ID may be the PDCP SDU 503. The PDCP SDU including the IP packet and no flow ID may be the PDCP SDU 603.

In one example, the first BS may forward the IP packet and the flow ID by forwarding the PDCP SDU in the format of the PDCP SDU 503. In another example, the first BS may forward the IP packet and the flow ID separately (i.e. not in the format of the PDCP SDU 503).

The first BS may associate a fourth PDCP SDU or an IP packet to the fourth PDCP SN for the UE, wherein the fourth PDCP SDU includes the flow ID and the IP packet. The UE may or may not compress the IP packet and may encrypt the fourth PDCP SDU, as described above. The first BS may transmit a fifth PDCP PDU including the fourth PDCP SDU to the UE.

In one example, the first BS may have neither associated the PDCP SDU nor the IP packet to the first PDCP SN when the first BS initiates the SCG change. In this case, the steps 604 and 906 can be skipped. The first BS may receive the IP packet from the CN.

The SCG bearer/the SCG split bearer and the MCG bearer/the MCG split bearer can be swapped. In one example, the RRC message may be a RRC Connection Reconfiguration message and the RRC response message may be a RRC Connection Reconfiguration Complete message. In one example, the RRC message may be a RRC Reconfiguration message and the RRC response message may be a RRC Reconfiguration Complete message.

The compression may be a header compression or a data compression. In the header compression, protocol header(s) in the IP packet are compressed. In the data compression, the IP packet (including IP header and data field) may be compressed or only data field of the IP packet is compressed.

In one example, the first and third BSs are gNBs and the second BS is an eNB. In one example, the first and third BSs are eLTE NBs and the second BS is an eNB. In one example, the first BS is a gNB, the third BS is an eLTE eNB and the second BS BS_2 is an eNB. In one example, the first BS is an eLTE eNB, the third BS is a gNB and the second BS is an eNB.

The data flow may be a packet flow or a Quality of Service (QoS) flow. In one example, the data flow may comprise an IP packet flow identified by at least one of a source IP address, destination IP address, source port number, destination port number, and transport protocol. In one example, the data flow may include packets matching a traffic flow template (TFT) filter. In one example, the data flow may be associated to a QoS profile which includes a plurality of QoS parameter. The TFT filter and/or the QoS profile may be defined by 3GPP specification(s).

In one example, the first BS allocates the flow ID to the UE, and the UE receives the flow ID from the first BS. In one example, the first BS may transmit a Non-Access Stratum (NAS) message including the flow ID to the UE. In another example, the first BS may transmit a RRC message including the flow ID, to the UE. The RRC message may configure the flow ID is associated to a DRB identity of the DRB. That is, the data flow is associated to the DRB.

The UE may transmit/receive one or more PDCP PDUs to/from the first BS via the DRB. Each of the PDCP PDUs may include a PDCP SDU which includes the flow ID and an IP packet.

The SCG change is used by the first BS to reconfigure configuration(s) for operation on SCG for the UE and may or may not require the UE to perform a random access procedure. The first BS initiates the SCG change to the second/third BS by transmitting a SBS addition request message or a SBS modification request message to the second/third BS.

The first BS performs a SBS release for the UE due to receiving a SBS release request from the second/third BS or due to transmitting a SBS release required to the second/third BS. The first BS performs the release of the SCG bearer or the SCG split bearer in response to a SBS modification procedure. The first BS may initiate the SBS modification procedure by transmitting a SBS modification required message to the second/third BS and the second/third BS responds with a SBS modification confirm message to the first BS. The second/third BS may initiate the SBS modification by transmitting a SBS modification request message to the first BS. The first BS forwards the IP packet to the second/third BS in response to the SBS modification request message.

In one example, the SBS modification request message is a SgNB Modification Request. The SBS addition request message is a SgNB Addition Request. The SBS release request message is a SgNB Release Request. The SBS modification request is a SgNB Modification Request. The SBS modification confirm is a SgNB Modification Confirm. The SBS modification required is a SgNB Modification Required.

Those skilled in the art should readily make combinations, modifications and/or alterations on the abovementioned description and examples. For example, the skilled person easily makes new examples of the network based on the examples and examples of the UE, and makes new examples of the UE based on the examples and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any process above may be compiled into the program code 214.

In view of above-mentioned examples, a better connectivity change for the UE in a dual connectivity can be acquired.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (BS), comprising:
   at least one storage device, configured to store program codes;
   a first communication interfacing device, configured to transmit signals or to receive signals with at least one BS;
   a second communication interfacing device, configured to transmit signals or to receive signals with a plurality of communication devices;
   at least one processing circuits, coupled to the at least one storage device and the first and second communication interfacing devices, configured to execute the program codes comprising following steps:
   (a) associating a first Packet Data Convergence Protocol (PDCP) Session Data Unit (SDU) to a first PDCP Sequence Number (SN), wherein the first PDCP SDU comprises a flow ID and an Internet Protocol (IP) packet;
(b) initiating a Secondary Cell Group (SCG) change for a first communication device with a second BS; and
(c) when the first PDCP SDU is associated with the first PDCP SN, controlling the first communication interfacing device to forward the IP packet but not to forward the flow ID, to the second BS in response to the SCG change;
wherein associating the first PCDP SDU to the first PDCP SN enables the SCG change to be performed without sending the flow ID.

2. The first BS of claim 1, the program codes further comprise:
(d) initiating a SCG change for a second communication device with a third BS; and
(e) controlling the first communication interfacing device to forward a first PDCP SDU for the second communication device to the third BS in response to the SCG change, wherein the first PDCP SDU includes a flow ID and an IP packet.

3. The first BS of claim 1, wherein the program codes further comprise:
controlling the second communication interfacing device to configure the flow ID, a Data Radio Bearer (DRB) and a Signaling Radio Bearer (SRB to the first communication device.

4. The first BS of claim 3, wherein the program codes further comprise:
controlling the second communication interfacing device to transmit a first PDCP Protocol Data Unit (PDU) via the DRB to the first communication device, wherein the first PDCP PDU includes the first PDCP SDU.

5. The first BS of claim 1, wherein the program codes further comprise:
controlling the second communication interfacing device to receive a second PDCP PDU via the DRB from the first communication device, wherein the second PDCP PDU includes the a second PDCP SDU and the second PDCP SDU includes a flow ID and an IP packet; and
controlling the first communication interfacing device to forward the IP packet but not to forward the flow ID, to the second BS in response to the SCG change.

6. The first BS of claim 2, wherein the program codes further comprise:
controlling the second communication interfacing device to receive a third PDCP PDU via the DRB from the second communication device, wherein the third PDCP PDU includes a third PDCP SDU and the third PDCP SDU includes a flow ID and an IP packet; and
controlling the first communication interfacing device to forward the flow ID and the IP packet, to the third BS in response to the SCG change.

7. A communication device for communicating between a first base station (BS) and a second BS, comprising:
a storage device, configured to store program codes;
a communication interfacing device, configured to transmit signals or to receive signals;
a processing circuit, coupled to the storage device and the communication interfacing device, configured to execute the program codes including following steps:
(a) associating a first Packet Data Convergence Protocol (PDCP) Session Data Unit (SDU) to a first PDCP Sequence Number (SN), wherein the first PDCP SDU comprises a flow ID and an Internet Protocol (IP) packet;
(b) controlling the communication interfacing device to receive a first Radio Resource Control (RRC) message from the first BS, wherein the first RRC message changes a Data Radio Bearer (DRB) from a Master Cell Group (MCG) bearer or a MCG split bearer to a Secondary Cell Group (SCG bearer or a SCG split bearer; and
(c) when the first PDCP SDU is associated with the first PDCP SN, controlling the communication interfacing device to transmit a first PDCP Protocol Data Unit (PDU) to the second BS when the DRB is changed to the SCG bearer or the SCG split bearer, wherein the first PDCP PDU comprises the IP packet but does not include the flow ID;
wherein associating the first PCDP SDU with the first PDCP SN enables the SCG change to be performed without sending the flow ID.

8. The communication device of claim 7, wherein the program codes further comprises:
(a) associating a second PDCP SDU to a second SN, wherein the second PDCP SDU comprises a flow ID and an IP packet;
(b) controlling the communication interfacing device to receive a second RRC message from the first BS, wherein the second RRC message changes a DRB from a MGC bearer or a MGC split bearer to a SCG bearer or a SCG split bearer; and
(c) controlling the communication interfacing device to transmit a second PDCP PDU to the second BS when the DRB is changed to the SCG bearer or the SCG split bearer, wherein the second PDCP PDU comprises the flow ID and the IP packet.

9. The communication device of claim 7, wherein the program codes further comprise configuring the flow ID, a DRB and a Signaling Radio Bearer (SRB) to communicate with the first BS.

10. A first base station (B S), comprising:
at least one storage device, configured to store program codes;
a first communication interfacing device, configured to transmit signals or to receive signals with at least one BS;
a second communication interfacing device, configured to transmit signals or to receive signals with a plurality of communication devices;
at least one processing circuit, coupled to the at least one storage device and the communication interfacing device, configured to execute the program codes comprising following steps:
(a) controlling the first communication interfacing device to receive a first secondary base station (SBS addition request message or a first SBS modification request message for a first communication device, from a second BS;
(b) configuring a flow ID and a Data Radio Bearer (DRB) to the first communication device via the second BS, in response to the first SBS addition request message or the first SBS modification request message, wherein the DRB is a Secondary Cell Group (SCG) bearer or an SCG split bearer and the flow ID identifies a data flow;
(c) associating a first Packet Data Convergence Protocol (PDCP) Session Data Unit (SDU) to a first PDCP Sequence Number (SN) or associating an Internet Protocol (IP) packet in the first PDCP SDU to the first PDCP SN for the first communication device, wherein the first PDCP SDU comprises the flow ID and an IP packet;

(d) performing an SBS release or a release of the SCG bearer or the SCG split bearer for the first communication device; and (e) when the first PDCP SDU is associated with the first PDCP SN, controlling the first communication interfacing device to forward the IP packet but not to forward the flow ID, to the second BS, in response to the SBS release or the release of the SCG bearer or the SCG split bearer;

wherein associating the first PCDP SDU to the first PDCP SN enables the SBS release or a release of the SCG bearer or the SCG split bearer to be performed without sending the flow ID.

11. The first BS of claim 10, wherein the program codes further comprise:

(f) controlling the first communication interfacing device to receive a second SBS addition request message or a third SBS modification request message from a third BS;

(g) configuring a flow ID and a DRB to the second communication device via the second BS, in response to the second SBS addition request message or the third SBS modification request message, wherein the DRB is a SCG bearer or a SCG split bearer and the flow ID identifies a data flow;

(h) associating a first PDCP SDU to a first PDCP SN for the second communication device or associates an IP packet in the first PDCP SDU to the first PDCP SN for the second communication device, wherein the first PDCP SDU comprises the flow ID and an IP packet;

(i) performing a SBS release or a release of the SCG bearer or the SCG split bearer for the second communication device; and (j) controlling the first communication interfacing device to forward the IP packet and the flow ID, to the third BS, in response to the SBS release or the release of the SCG bearer or the SCG split bearer.

12. The first BS of claim 11, wherein the program codes further comprises:

controlling the second communication interfacing device to receive a second PDCP PDU via the DRB from the second communication interfacing device, wherein the second PDCP PDU includes a second PDCP SDU and a second PDCP SN and the second PDCP SDU includes the flow ID and an IP packet; and controlling the first communication interfacing device to forward the flow ID and the IP packet to the third BS in response to the SBS release or in response to the release of the SCG bearer or the SCG split bearer.

13. The first BS of claim 10, wherein the program codes further comprises:

controlling the second communication interfacing device to receive a second PDCP PDU via the DRB from the first communication interfacing device, wherein the second PDCP PDU includes a second PDCP SDU and a second PDCP SN and the second PDCP SDU includes the flow ID and an IP packet; and controlling the first communication interfacing device to forward the IP packet but not to forward the flow ID to the second BS, in response to the SBS release or in response to the release of the SCG bearer or the SCG split bearer.

* * * * *